(12) United States Patent
Lomax

(10) Patent No.: US 9,062,784 B2
(45) Date of Patent: Jun. 23, 2015

(54) VALVE ASSEMBLY AND COMPONENTS THEREFORE

(75) Inventor: Stuart Lomax, Brighouse (GB)

(73) Assignee: Xamol Limited, Brighouse, West Yorkshire (GB)

( * ) Notice: Subject to any disclaimer, the term of this patent is extended or adjusted under 35 U.S.C. 154(b) by 126 days.

(21) Appl. No.: 13/820,845

(22) PCT Filed: Sep. 9, 2011

(86) PCT No.: PCT/GB2011/051689
§ 371 (c)(1),
(2), (4) Date: Sep. 19, 2013

(87) PCT Pub. No.: WO2012/032356
PCT Pub. Date: Mar. 15, 2012

(65) Prior Publication Data
US 2014/0001388 A1    Jan. 2, 2014

(30) Foreign Application Priority Data

Sep. 10, 2010    (GB) .................................. 1015032.4

(51) Int. Cl.
| F16K 5/06 | (2006.01) |
| F16K 11/10 | (2006.01) |
| F16K 5/20 | (2006.01) |
| F16K 27/06 | (2006.01) |

(52) U.S. Cl.
CPC ............... *F16K 11/10* (2013.01); *F16K 5/0678* (2013.01); *F16K 5/0631* (2013.01); *F16K 5/201* (2013.01); *F16K 5/0642* (2013.01); *F16K 27/067* (2013.01); *F16K 5/0663* (2013.01)

(58) Field of Classification Search
CPC ............. F16K 5/20; F16K 5/21; F16K 11/10; F16K 5/06; F16K 5/0663; F16K 5/0673; F16K 5/0678
USPC ............... 251/170, 174, 180, 315.08, 315.09, 251/314; 137/613
See application file for complete search history.

(56) References Cited

U.S. PATENT DOCUMENTS

| 3,382,892 A | 5/1968 | Cerbin |
| 4,137,936 A * | 2/1979 | Sekimoto et al. ............. 251/174 |
| 4,262,688 A | 4/1981 | Bialkowski |
| 4,428,561 A | 1/1984 | Thompson |
| 4,953,587 A * | 9/1990 | Steele ........................... 251/174 |
| 6,220,290 B1 * | 4/2001 | Lomax ........................... 137/613 |
| 2004/0016463 A1 | 1/2004 | Shillito et al. |

* cited by examiner

*Primary Examiner* — Kevin Lee
(74) *Attorney, Agent, or Firm* — McKee, Voorhees & Sease, PLC

(57) ABSTRACT

A valve assembly, including a valve body, at least one passage along which fluid can be selectively allowed to pass, and at least one ball located in the passage so as to be movable between a first position in which a channel in the ball forms part of the passage and a second position in which the ball prevents fluid passing and wherein at least one end of the body and depending inwardly towards one side of the at last one ball there is provided is retention assembly.

31 Claims, 9 Drawing Sheets

VALVE ASSEMBLY AND COMPONENTS THEREFORE

CROSS-REFERENCE TO RELATED APPLICATIONS

This is a National Phase application claiming priority to PCT/GB2011/051689 filed Sep. 9, 2011 which claims priority to GB1015032.4 filed Sep. 10, 2010, all of which are herein incorporated by reference in their entireties.

FIELD OF INVENTION

The invention to which this application relates is to improvements to a valve assembly and particularly, although not necessarily exclusively, to a valve assembly in the form of a block and bleed valve assembly in which there is provided first and first and second, or more, valve balls located along a fluid passage formed in the body of the valve.

BACKGROUND OF THE INVENTION

Conventionally, the manufacture of the block and bleed valve, is well known however there is always pressure with regard to the design of the same to ensure that the dimensions of the valve, and in particular, the length of the same, meet International standards.

The applicant has a series of granted patents and co pending patent applications which address this issue and further prior art documents are known such as, EP1322886, which also attempt to address the dimensional challenges, with varying degrees of success.

The applicant has identified that for certain requirements the prior art valve assemblies do not provide a satisfactory solution.

The aim of the present invention is therefore to provide a new form of valve assembly which allows the same to fulfil the requirements for International standards while, at the same time, take into account commercial and manufacturing considerations.

SUMMARY OF THE INVENTION

In a first aspect of the invention, there is provided a valve assembly, said valve assembly including at least one passage along which fluid can be selectively allowed to pass, said assembly including a valve body in which the passage is formed and at least one ball located in the passage so as to be moveable between a first position in which a channel in the ball forms part of the passage and a second position in which the ball prevents fluid passing along the passage and wherein at at least one end of the body and depending inwardly towards one side of the at least one ball there is provided a retention assembly, said assembly comprising a first annular member to contact with the ball, a second annular member receiving and locating at least one biasing means, said first and second annular members located within an annular housing, said annular housing retained within the valve body, and an annular securing member which is engaged with the valve body and which has an outer face which forms or receives an external sealing face for the valve assembly to a pipeline or pipeline flange.

In one embodiment the annular housing and annular securing member are independently retained with the valve body.

In an alternative embodiment the annular housing is retained in the valve body by the annular securing member.

Typically, the external sealing face, is adapted in a suitable manner so as to allow the same to be engaged and sealed with a pipeline or a pipeline flange in conjunction with which the valve is to be used.

In one embodiment, a retaining assembly as described is provided at each end of the valve body.

In one embodiment, the valve assembly includes at least first and second balls provided at spaced locations along the fluid passage formed in the valve body and a first retaining assembly is provided at the first end of the valve body to contact with one side of the first ball. In one embodiment a second retaining assembly is provided at the other end of the valve body to locate with a side of the second ball.

Typically, a sealing assembly is provided between the first and second balls so as to locate with the respective opposing sides of the balls which are not in contact with a retaining assembly.

In one embodiment there is provided a first annular seat for contact with a face of a first ball and a second annular seat for contact with a face of the second ball and said first and second seats are provided with at least one biasing means depending between the same.

In one embodiment a plurality of biasing means are provided spaced apart around a circular path at the periphery of the said passage.

In one embodiment the biasing means pass through a channel formed in a portion of the body or another member which depends partially inwardly so as to locate the biasing means with respect to the longitudinal axis of the same.

In one embodiment the first annular member is formed as a valve seat for sealing contact with the ball side. In this embodiment the valve seat and hence first annular member is formed of a metal or metal alloy. In an alternative embodiment the first annular member supports and receives thereon a valve seat. In this embodiment the valve seat is formed of a rubber or equivalent material.

In one embodiment, the biasing means provided in the second annular member are a series of springs provided at spaced locations around a circular path. In one embodiment first ends of the springs are located in the second annular member. In one embodiment the said spring ends are received and located in a part of the second annular member which is received in a recessed portion in the first annular member so as to locate the second annular member. In whichever embodiment the springs are provided within the retention assembly so that the same are held in compression so as to act on the first annular member to bias the first annular member towards contact with the ball.

In one embodiment, the opposing ends of the biasing means springs are located with the face of the annular housing which in turn is retained in position within the valve body by the threaded engagement of the annular securing member with the valve body. Thus, it can be ensured that at all times, the biasing means springs exert sufficient force on the first annular member so as to provide a sufficient seal with the ball.

Typically, sealing means are provided between the first annular member and the annular housing and the second annular member with the annular housing.

Typically, at least one sealing means is provided between the annular housing and the valve body.

Typically, at least one sealing means is provided between the annular ring and the valve body.

In a further embodiment of the invention, the biasing means are provided to act on the second annular member and are located within the annular housing such that the biasing means springs act on the second annular member to move the same towards the first annular member and in turn, to move the first annular member into engagement with the ball.

In one embodiment the components which are located within and along the valve body are moved into position from one, common, end of the valve body and the components are retained in position by the engagement of the annular housing and/or annular securing member in position at or adjacent to the end of the body from which the components are moved into position, once the components are in position.

In one embodiment the components include, in order of insertion into the valve body, a first sealing ring for a first valve ball, the first valve ball, a spigot for the first valve ball, a sealing assembly for the first valve ball and a second valve ball, the second valve ball, a spigot for the second valve ball, the annular housing with first and second sealing members located therein, and an annular securing member.

In a further aspect of the invention there is provided a retaining assembly for use in a valve assembly to retain the components of the valve passage therein, said retaining assembly including an annular housing having first and second annular members located therein and an annular securing means wherein one or both of the annular housing and/or annular securing means, are provided in engagement with the valve assembly body so as to retain the retaining assembly in position and provide the first and second annular members in the required position within the valve body.

Further aspects of the invention which can be used separately to, or in conjunction with, the valve assembly features described above, are now described.

In the further aspect of the invention, there is provided a valve assembly, said valve assembly including a valve body having a fluid passage therein and at least one ball mounted in the passage, said ball moveable between a first position in which a channel in the ball is provided in line with the passage so as to allow fluid to flow there through and a second, closed position in which the ball prevents fluid from passing along the passage, said ball mounted on first and second trunnions so as to be rotatable and wherein at least one of said trunnions is mounted and located internally of the valve body.

This is in contrast to the conventional fixed trunnion arrangement in which there is typically provided first and second trunnions locating with opposing sides of the ball and each of said trunnions is located to the exterior of the valve, one having a stem which can be operated to turn the valve ball and the other trunnion having a flange which is located externally of the valve body and which is bolted in position to secure it to the valve body.

Typically, the location of the flange and the bolting of the same on the valve body means that the valve body has to be of a relatively large size to receive the bolts and to provide the strength for securing the flange and hence lower trunnion to the valve body. This problem is overcome by the current invention in that the lower trunnion is located within a recess depending into the valve body from the fluid passage such that the lower trunnion does not have to pass through the valve body and does not have to be located externally of the valve body.

By locating the trunnion within the valve body, there is no need to bolt the same externally to the valve body and hence the dimensions of the valve body can be reduced significantly.

In one embodiment, the lower trunnion is formed as a solid cylinder or peg, with a first end received within the recess of the valve body and a second end received within a recess of the ball.

In one embodiment the said cylinder or peg is introduced into position within the valve body by first placing the ball into position in the valve body and then passing the peg or cylinder into the channel in the ball and then through a locating aperture in the ball and into the receiving recess of the valve body so that the peg or cylinder is received in the recess and the locating aperture.

In one embodiment a securing means is then put into position to secure the peg or cylinder in position with the ball and/or valve body.

Typically, the movement of the ball with respect to the peg and valve body is achieved by movement of the first trunnion opposing the said peg and which can be provided in a conventional manner.

Typically the second trunnion is located on the opposite side of the ball from the first trunnion and the longitudinal axes of the first and second trunnions define the axis of rotation of the ball between first and second positions.

In a further aspect of the invention there is provided a valve assembly including at least one passage along which fluid can be selectively allowed to pass, said assembly including a valve body in which the passage is formed and at least first and second balls located in the passage, each selectively movable between a first position in which a channel in the ball forms part of the passage and a second position in which the ball prevents fluid passing along the passage and wherein a sealing assembly is provided in the space in the valve body between said balls, said sealing assembly including a sealing ring for location with a face of a first ball and a sealing ring for location with a face of the other of said balls and wherein biasing means are provided with a first end of each of the biasing means located to act on the first sealing ring and a second end located to act on the second sealing ring.

In one embodiment the first and second sealing rings are separate components.

In one embodiment at any given time the biasing means act to bias one of the sealing rings into contact with the respective ball surface.

In one embodiment a plurality of biasing means are provided spaced along a circular path.

In one embodiment the biasing means are located in position by the location of the ends with the respective sealing rings.

Typically at least a portion of the biasing means intermediate the ends of the same are located in a channel for each respective biasing means. Preferably the said channels are formed in a portion of the valve body. The provision of the locating channels acts to prevent the possibility of the springs being twisted along their longitudinal axes by the rotational movement of the sealing rings which may occur during use of the valve. Typically the said portion protrudes into the passage of the valve body and is located intermediate the first and second sealing rings.

In an alternative embodiment the said channels are provided in a member located between the first and second sealing rings.

In a yet further aspect of the invention there is provided a valve assembly including at least one passage along which fluid can be selectively allowed to pass, said assembly including a valve body in which the passage is formed and at least one ball located in the passage so as to be moveable between a first position in which a channel in the ball forms part of the passage and a second position in which the ball prevents fluid passing along the passage and at at least one end of the body and depending inwardly towards one side of the at least one ball there is provided a retention assembly and wherein the components to be located along the passage of the valve body are introduced into the valve body from the same common end and then retained in position by the movement of the said retention assembly into position at said end of the valve body.

In one embodiment the retention assembly is an annular securing member provided to be engaged with the valve body.

In one embodiment the retention assembly includes a first annular member to contact with the ball, a second annular member receiving and locating at least one biasing means, said first and second annular members located within an annular housing, said annular housing retained within the valve body, and the annular securing member which is engaged with the valve body and which has an outer face which forms or receives an external sealing face for the valve assembly to a pipeline or pipeline flange.

In one embodiment, for a single ball valve the components which are moved into position and located within the passage from the common end include a first sealing ring for a first ball, a first ball, a trunnion for the first ball a sealing assembly for sealing against the opposing surface of the first ball from the first sealing ring and the annular securing member.

In one embodiment, for a double ball valve the components located within the passage from the common end include a first sealing ring for a first ball, a first ball, a trunnion for locating the first ball, a sealing assembly for sealing against the opposing surface of the first ball from the first sealing ring, and a surface of a second ball, the second ball, a trunnion for locating the second ball, means for sealing against the opposing surface of the second ball from the sealing assembly and the annular securing member.

Typically the sealing assembly includes biasing means which are located in position by respective sealing rings for the first and second balls.

Typically the valve assembly formed is what is commonly referred to as a double block and bleed valve assembly.

In a yet further aspect of the invention there is provided a method of positioning and locating the components required within a body of a valve assembly to form the same, said valve assembly including first and second balls located along a passage within a valve body and along which passage fluid can be selectively allowed to flow by selectively positioning the said first and second balls by rotating the same, said method comprising the steps of introducing from one open end of the valve body and into the same so as to be positioned along said passage, a first sealing ring for a first ball, a first ball, a trunnion for locating the first ball, a sealing assembly for sealing against the opposing surface of the first ball from the first sealing ring, and a surface of a second ball, the second ball, a trunnion for locating the second ball, means for sealing against the opposing surface of the second ball from the sealing assembly and an annular securing member.

Typically at least the annular securing member is engaged with the valve body so as to close the passage at the open end to a sufficient extent to retain the components in position within the valve body.

Specific embodiments of the invention are now described with reference to the accompanying drawings; wherein

DETAILED DESCRIPTION OF THE INVENTION

Figure 1A:
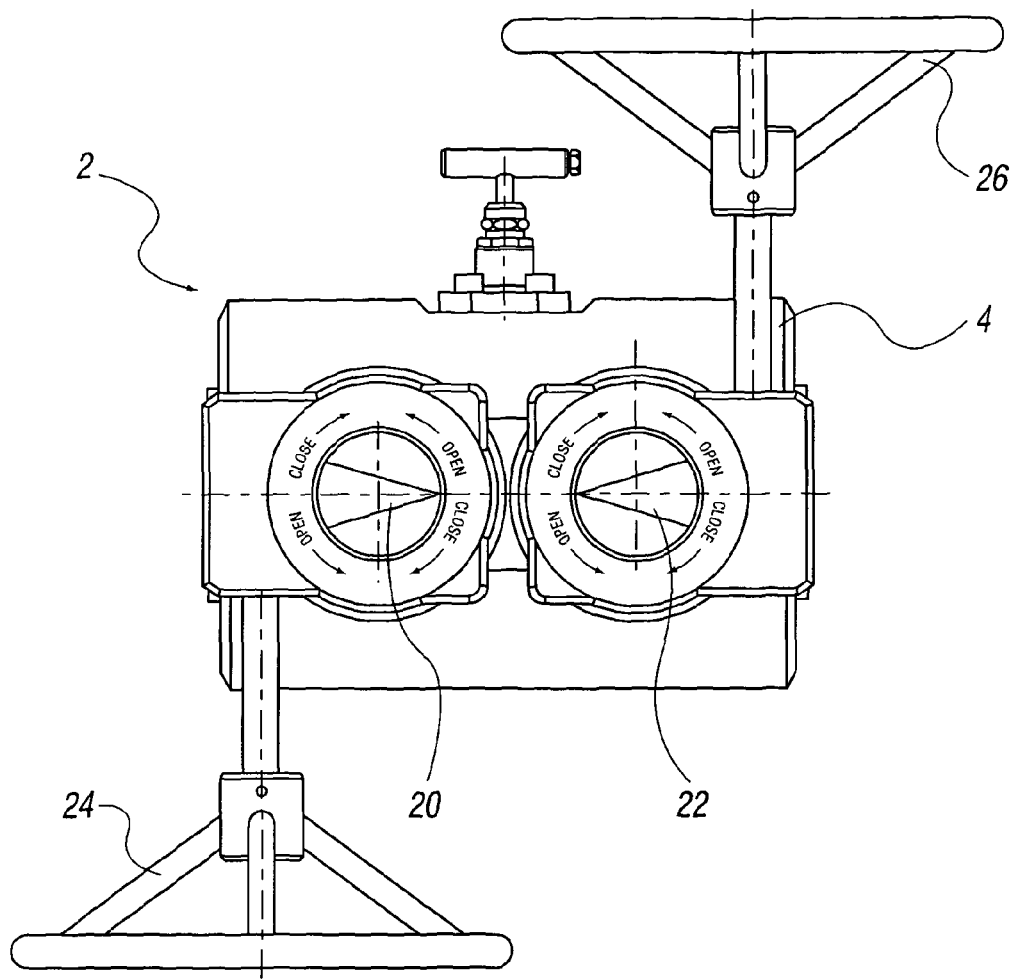
FIGS. 1a-c illustrate a first embodiment of a valve in accordance with the invention.

Referring firstly to FIGS. 1a-d, there is illustrated a valve 2 in accordance with one embodiment of the invention. The valve 2 includes a valve body 4 in which there is formed a passage 6 along which fluid can pass from a first pipeline end located at a first end 8 of the valve body and towards a second pipeline located at the opposing end 10 of the valve body.

In this embodiment, located within the passage within the valve body, are first and second balls 12. The balls are shown in FIG. 1b, in an open position inasmuch that channels 16 formed in each of the balls are provided in line with the passage 6 so as to allow fluid to pass along the passage of the valve body. However, the balls can be individually rotated about the respective axes 20, 22 to a closed position in which the ball channel is no longer in line with the passage and prevents the passage of fluid along the passage 6. Operating means for the respective balls are provided in the form of rotatable handles 24, 26 and the balls are mounted in respect of the valve body via trunnions in the form of upper trunnions 28 to which the handles are connected and lower trunnions 30, which trunnions are located with opposing sides, typically top and bottom, of the respective ball.

It is necessary for the ball to be located within the valve body in a sealed manner and in accordance with this embodiment of the invention at each end of the valve body there is provided a retaining assembly 32, 34. In each of the retaining assemblies, there is provided a first annular member 36 which is provided to contact in a sealing manner with a side of the ball. The first annular member can be formed as a valve seat in it's entirety or can be provided to secure and support a valve seat material therewith. The first annular member is acted upon by biasing means in the form of springs 38 which are provided at spaced locations along a circular path in a second annular member 40. One end of the springs contact with the second annular member as shown and the opposing end of the biasing means springs 38 contact with a face of an annular housing 42 which has a recess 49 in which the first and second annular members are located.

Figure 1B:
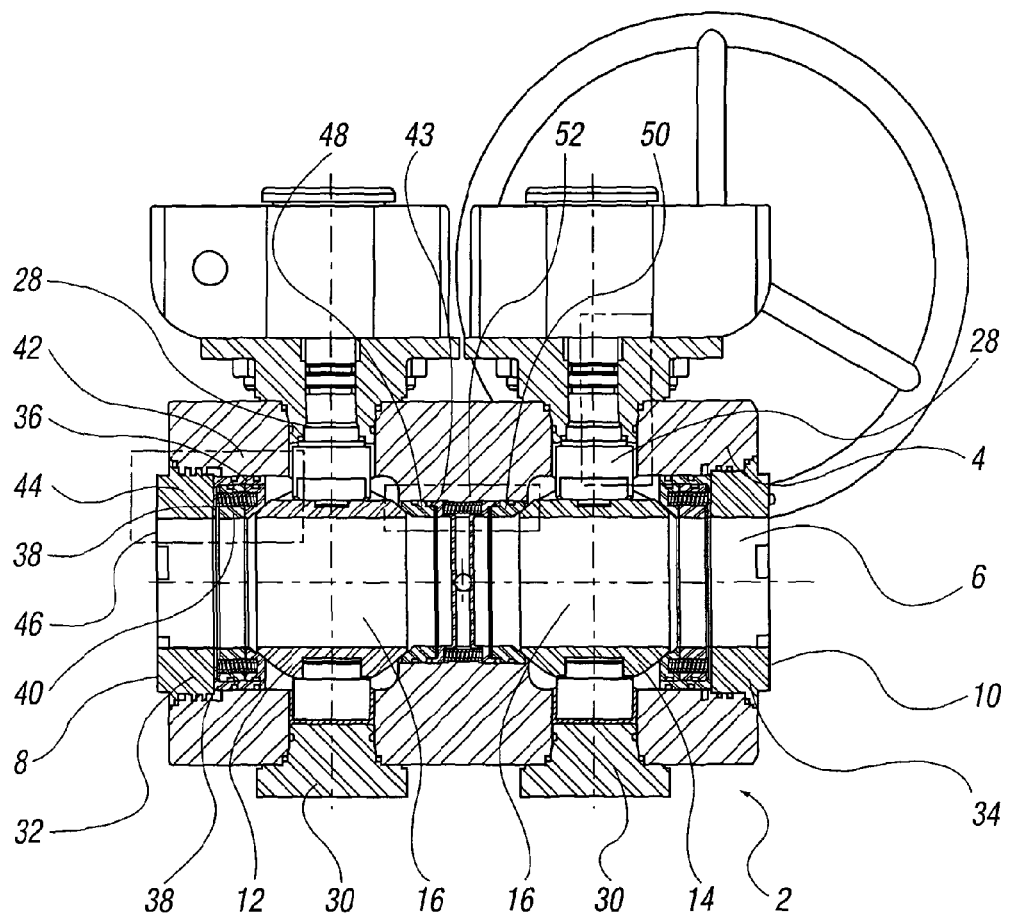
Figure 1C:
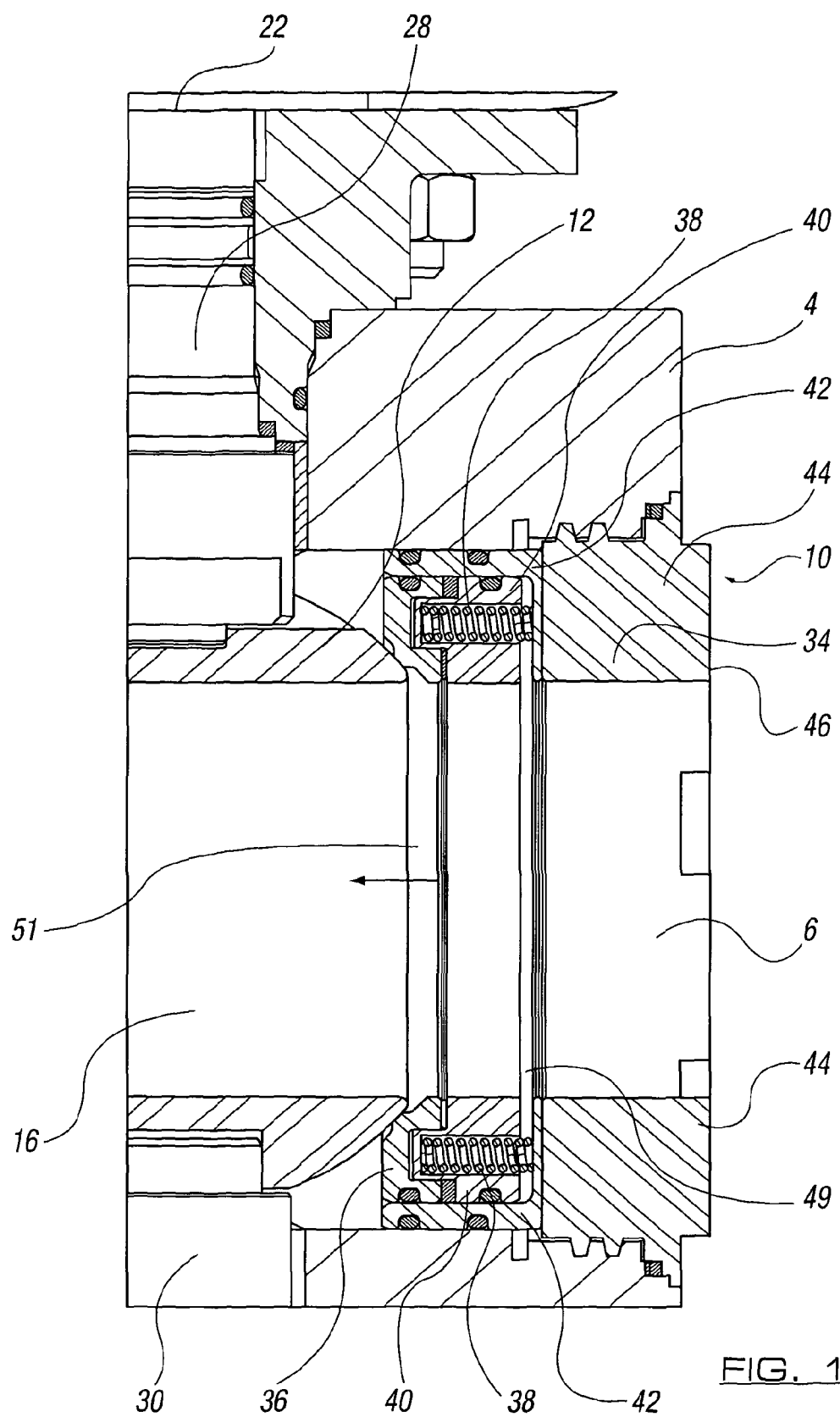
Figure 1D:
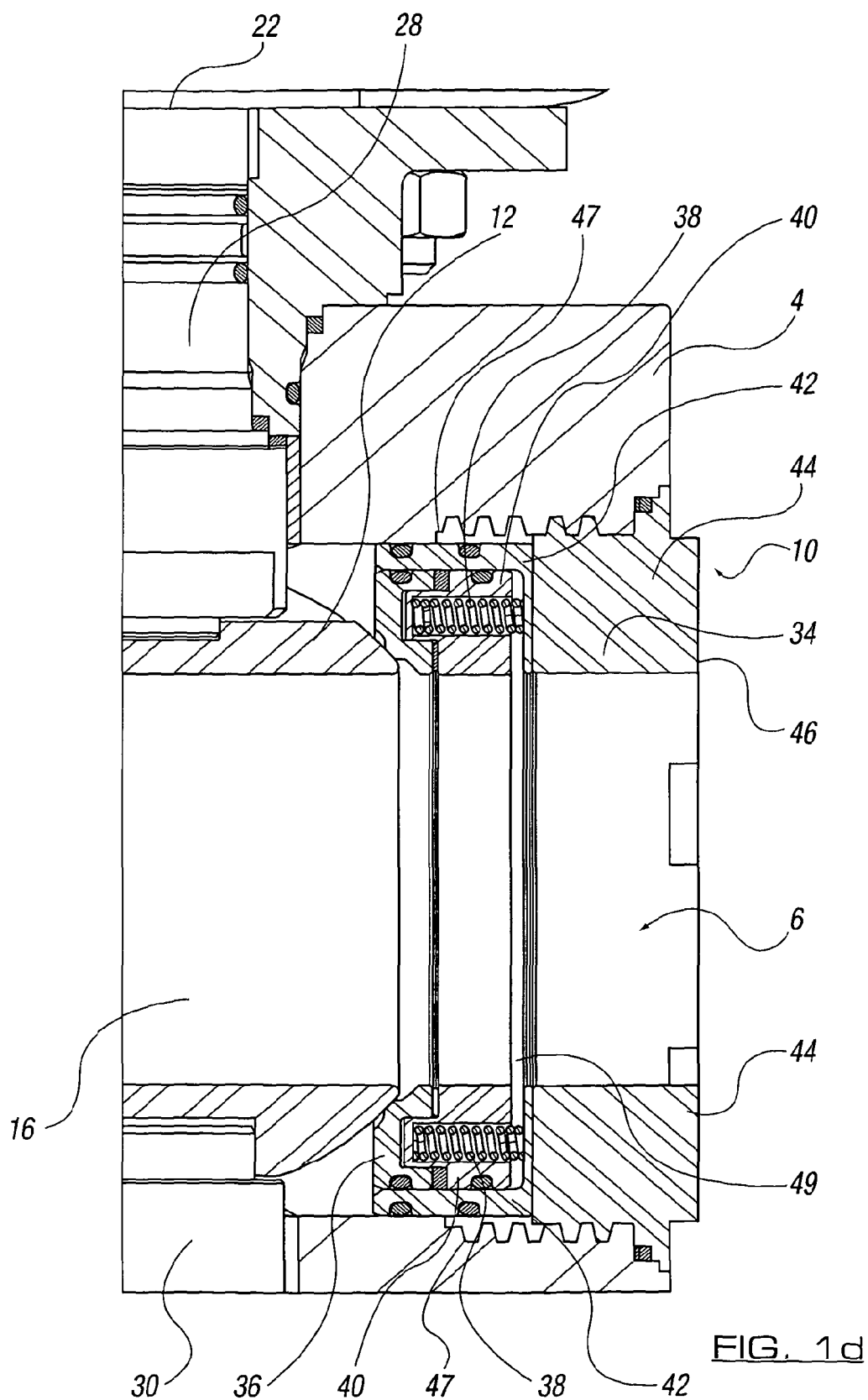
FIG. 1d illustrates an alternative embodiment to part of the assembly shown in FIGS. 1a-c FIGS. 2a and b illustrate a second embodiment of a valve in accordance with the invention.

The biasing means are provided as compression springs of a size and strength such that when the components of the retaining assembly are in position the springs act to bias the first annular member towards sealing engagement with the ball as indicated by arrow 51 in FIG. 1c. In FIG. 1c the annular housing is located with respect to the valve body by the provision of an annular securing member 44 which is provided in threaded engagement with the valve body and which can be screwed in to the open end of the valve body to a position so as to locate the annular housing and hence first and second annular members in the required sealing locations with the ball. In FIG. 1d which is a preferred embodiment the annular housing 42 is provided in threaded engagement with the valve body as shown by threads 47 so that the annular housing is independently located and retained in position with the valve body. In this embodiment the annular securing member is again provided and in this case is again threadedly secured to the valve body but does not act on the annular housing and indeed need not be in contact with the same as it is not required to exert any retaining force on the annular housing 42.

In either embodiment the external face 46 of the annular securing member can be adapted to have a pipeline sealing form which meets International requirements so as to allow the same to be sealed to a flange of a pipeline. This therefore means that the remainder of the retaining assembly components can be provided in a common manner and only the annular securing member need be provided to include a particular form of pipeline sealing means on the external sealing face. Thus common valve assemblies can be formed under factory conditions and tested with the appropriate securing member provided at the factory or at the location of connection to the pipeline to suit the particular pipeline sealing arrangement requirements and pipeline sealing formation for that particular job. This therefore greatly simplifies the manufacturing operation where conventionally the entire retaining assembly, as it is typically a one piece construction, has to be provided with the required pipeline sealing formation at the factory and at the time of manufacture and tested with the appropriate pipeline sealing formation already provided.

Thus, in accordance with the invention, there is provided a retaining assembly which has a plurality of components which ensure that the appropriate sealing arrangement is provided with the ball and that the ball is appropriately located and retained within the valve body. However, at the same time, the retaining assembly is provided in a form and configuration such that the overall valve assembly which is formed can be formed of a length which falls within the International specification.

Figure 4C:
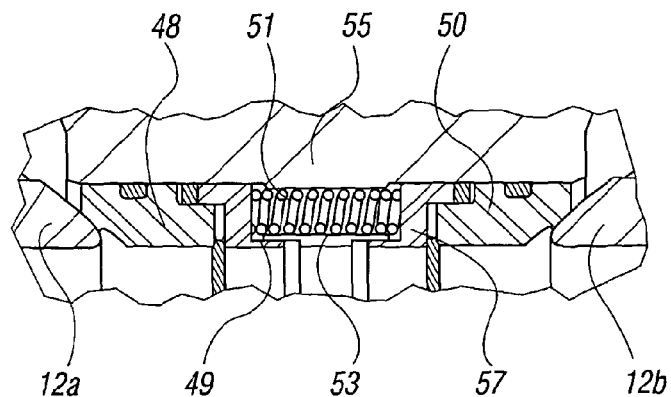
FIGS. 4a-c illustrate two embodiments of a sealing assembly in accordance with the invention.
Figure 4A:
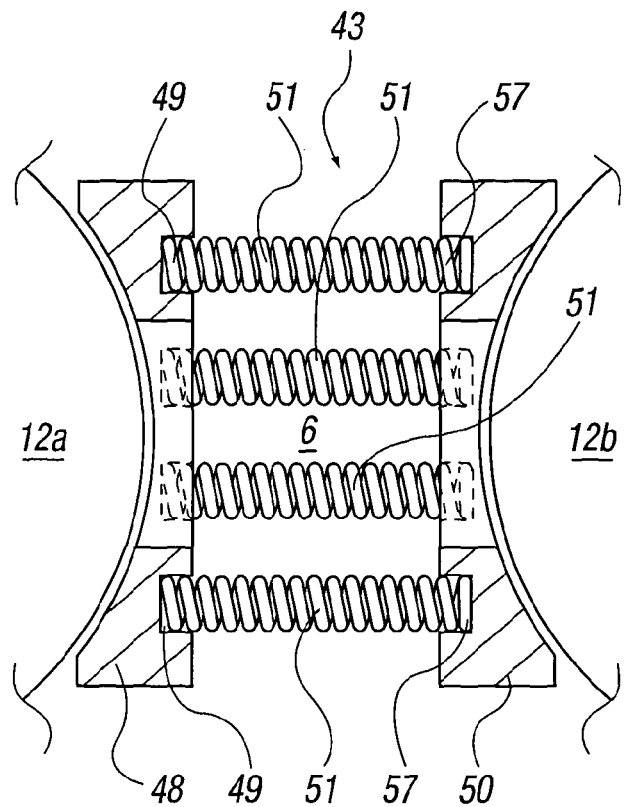
Figure 4B:
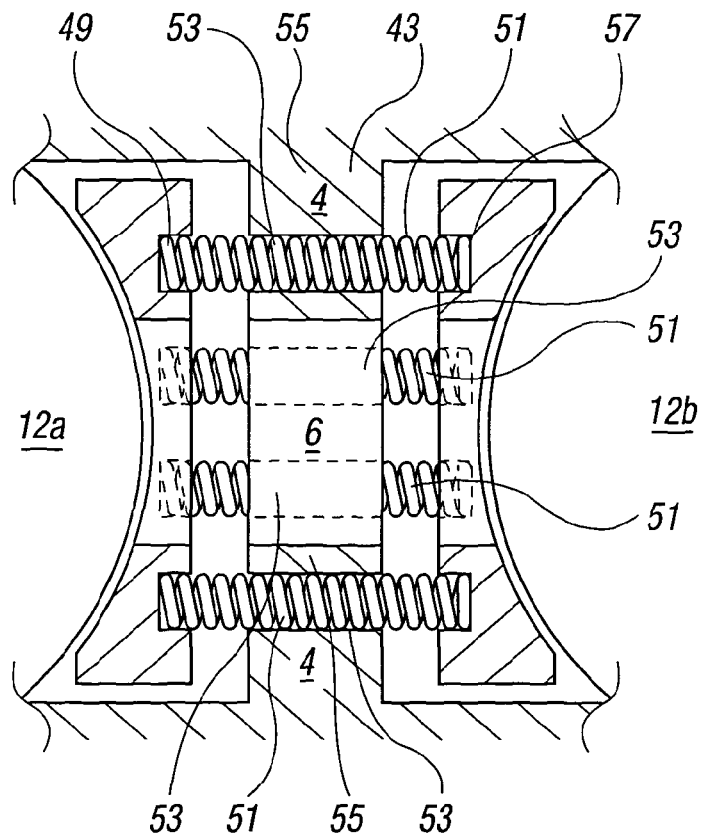

Preferably, in the spacing between the respective balls 12 and 14 there is provided a sealing assembly 43 which comprises first and second sealing rings 48, 50 located with a central assembly 52 which includes a plurality of springs located around a circular path, said springs acting on both the first and second sealing members 48, 50 to bias the same towards contact with the respective balls 12. Once again, provision of this central sealing assembly, allows the overall length of the valve to be reduced in comparison to the conventional sealing assembly. Two possible embodiments of this sealing assembly are described with reference to FIGS. 4a-c, which both show sectional views along the central axis of the sealing assembly located intermediate the balls of the valve assembly. In FIG. 4a there is illustrated a first embodiment in which first and second sealing members 48, 50 are provided to act on surfaces of respective balls 12a and 12b. In this case the opposing ends 49, 57 of each of the plurality of springs 51 which are spaced around the passage along a circular path are located in and act on the first and second members 48, 50 respectively. It is found that at any given time only one of the sealing members needs to be biased to act on one of the valve balls, depending on the flow of fluid at that time and hence the particular sealing member which is required to apply sufficient pressure to create the seal with the appropriate ball. This therefore means that the springs are able to apply the biasing force on one of the sealing members at any given time as required rather than applying a biasing force against both sealing members simultaneously, although this could be achieved by the sealing assembly if required. Particularly, although not necessarily exclusively, in smaller valve assemblies the springs may be susceptible to deformation by twisting or bending about their longitudinal axis if, for example, there is relative rotational movement between the first and second sealing members during use of the valve. This bending could cause the biasing effect to be adversely affected and therefore in accordance with the embodiment shown in FIGS. 4b and c each of the springs is located to pass through a channel 53 so that the springs are each located by their respective channel intermediate the ends of the spring. As the channels are typically provided in a member which is provided in a fixed position in the valve body or more typically provided in a portion 55 which is formed as an integral part of the valve body 4 as shown in FIGS. 4b and c, the intermediate portions of the springs are provided in a fixed location and therefore cannot be bent by any relative rotational forces from the first or second sealing members with which the spring ends are located and so the biasing force of the springs can be maintained.

Figure 2A:
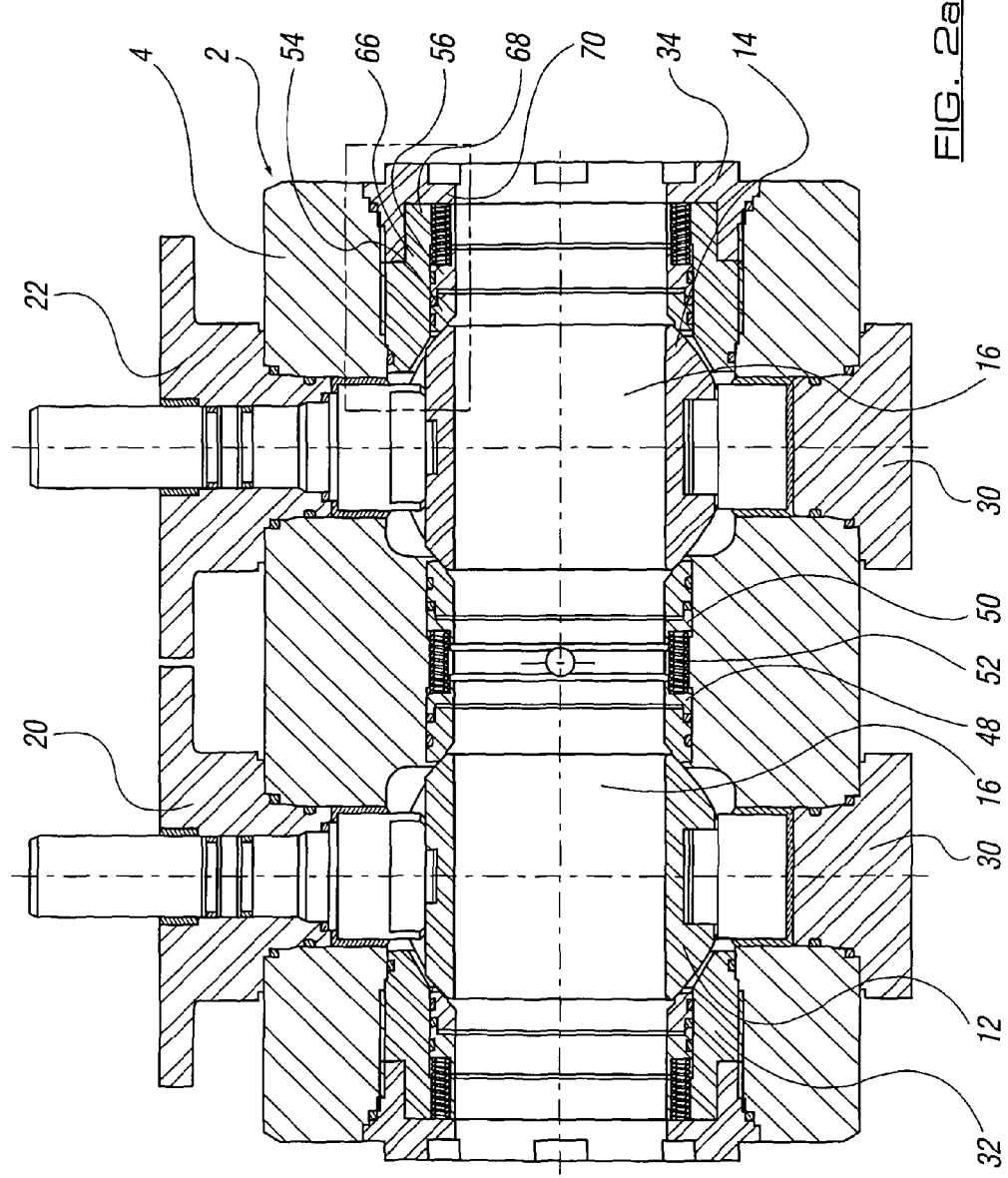

Referring to FIGS. 2a and b, there is provided a further embodiment of a valve assembly in accordance with the invention and, where appropriate, the same reference numerals have been used for the same components as used in FIGS. 1a-c.

Figure 2B:
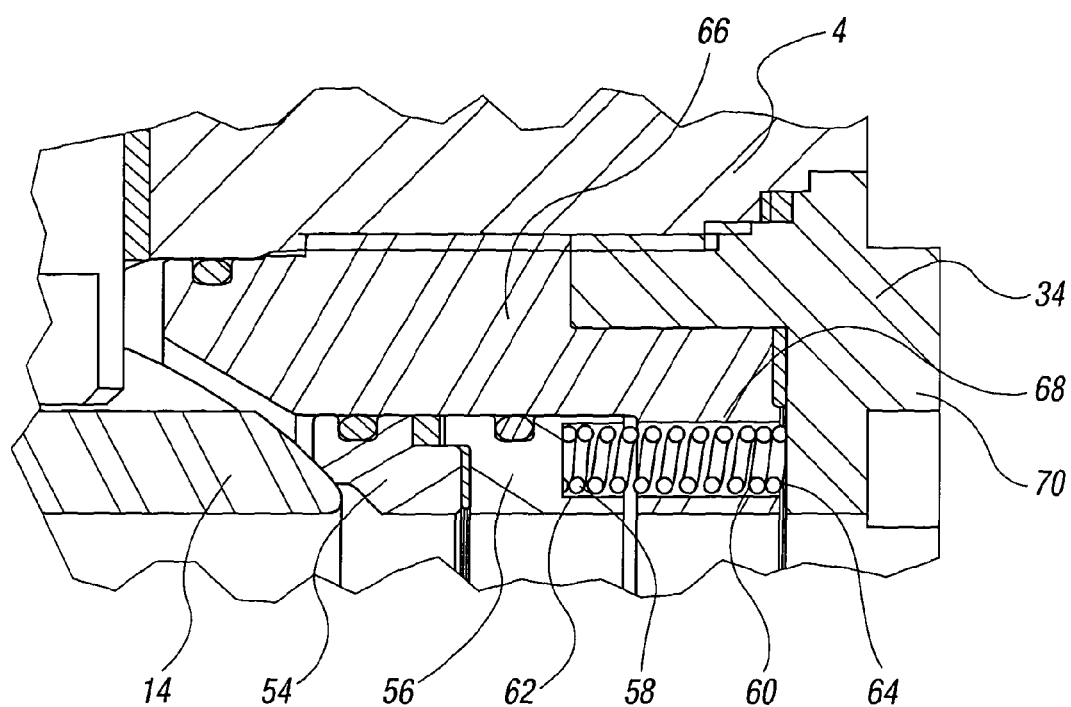

In this case, the retaining assemblies 32, 34 are of a different design to that shown in the embodiment of FIGS. 1a-c. In this case, the retaining assembly 34, details of which are shown in FIG. 2b, comprises a first annular member 54 which is provided to engage sealingly with the ball 14 and which is acted upon by second annular member 56. The second annular member receives an end 58 of each of a plurality of biasing springs 60 which are provided at locations along a circular path with the ends 58 being received within a recess 62 in the second annular member 56. The opposing end 64 of each of the springs 60 is received in a recess 68 in an annular housing 66. In turn, the annular housing 66 is located with respect to the valve body 4 by annular securing member 70. In this case, both the annular securing member 70 and the annular housing 66 can be threadedly engaged with the valve body 4 so as to secure the retaining assembly in position as is also illustrated in FIG. 1d.

In both embodiments, sealing means in the form of o-rings can be selected to be located at positions between respective components of the retaining assembly, and the retaining assembly and the valve body so as to ensure that fluid seepage through the retaining assembly and through the interface between the assembly and the valve body is prevented.

The embodiments shown herein and the inventive aspect provide several key advantages over the prior art. In particular the invention allows greater flexibility in the use of the retention assembly and maintenance of the same with respect to the prior art arrangements. For example, in the current invention by removing the annular securing member the first annular member, second annular member and annular housing as well as the springs can be removed and replaced or maintained without the need to loosen the ball and trunnion stems or corrupting the major body seal, which would affect the factory set geometry of those components and potentially invalidate warranty if the primary pressure seal was broken.

Furthermore by having the arrangement shown there is less susceptibility to loosening of the retention of the valve seat position in service due to vibration. This is in contrast to a single retaining component as shown in the prior art which is more susceptible to loosening and which is why this conventional design typically requires an external (tangential) retaining bolt to be fitted which corrupts the body integrity because this retaining bolt, for it to connect to the inner insert, requires a hole to be drilled through the pressure retaining outer body wall to the inner body wall to make contact with the insert it intends to retain.

The provision of the annular housing and annular securing member allows the removal of one without corrupting the valve's body pressure integrity, which means that the outer insert with say an RTJ pipeline seal formation groove machined upon it can be removed and replaced with another outer insert of the same dimensions with a raised face finish to provide a different form of external sealing face. As a result the valve assembly in accordance with the invention has an element of universal interchangability between pipeline seal standards rather than being a dedicated size/pressure class/sealing face type product as is conventionally the case.

The ability to provide the annular securing member as a separate component allows the same to be manufactured of alloy steels at a lower cost. Alloy inserts are required to comply with client required hardness values to make positive pipeline seals when using a soft material intermediate sealing ring, such as RTJ flange standards. The alternative to alloy inserts can be welded inlay, which is expensive and requires additional testing including radiography; all are not required with the current invention. Furthermore the annular securing member can be considered as sacrificial. For example should a prior art design valve be dropped on its end or bumped the end flange seal may become damaged the valve will require stripping down, the part replacing, and the valve re-testing and even returning to the factory.

Whereas, in the current invention if the annular securing member suffers the same damage the same can be replaced on site without the need to strip down the valve or re-test.

Figure 3B:
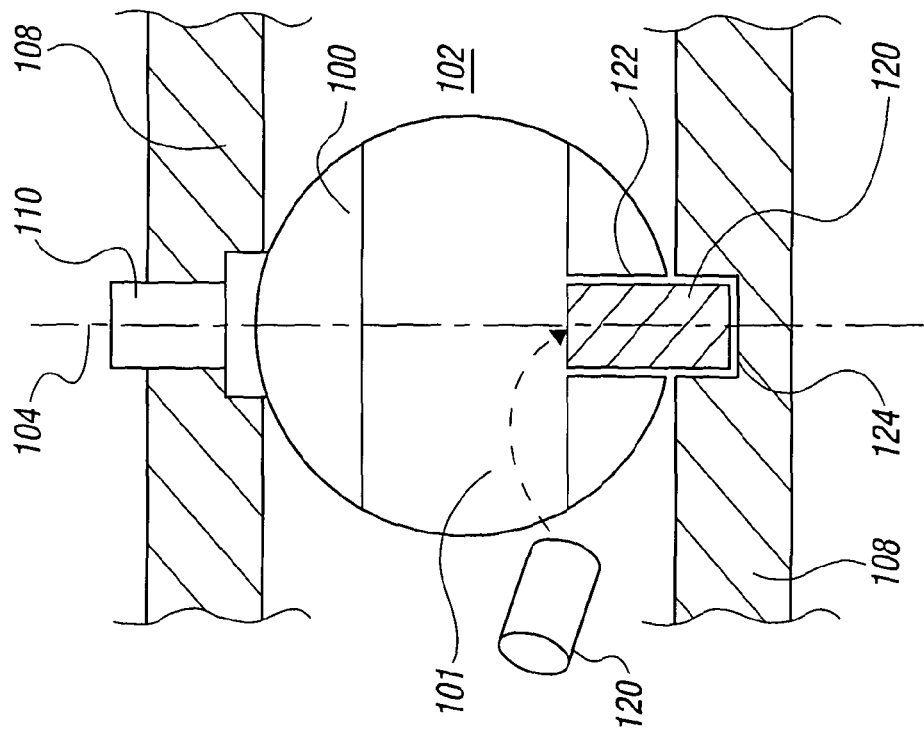
FIGS. 3a and b illustrate, respectively, a conventional ball and trunnion arrangement and an embodiment of a ball and trunnion arrangement in accordance with the invention.
Figure 3A:
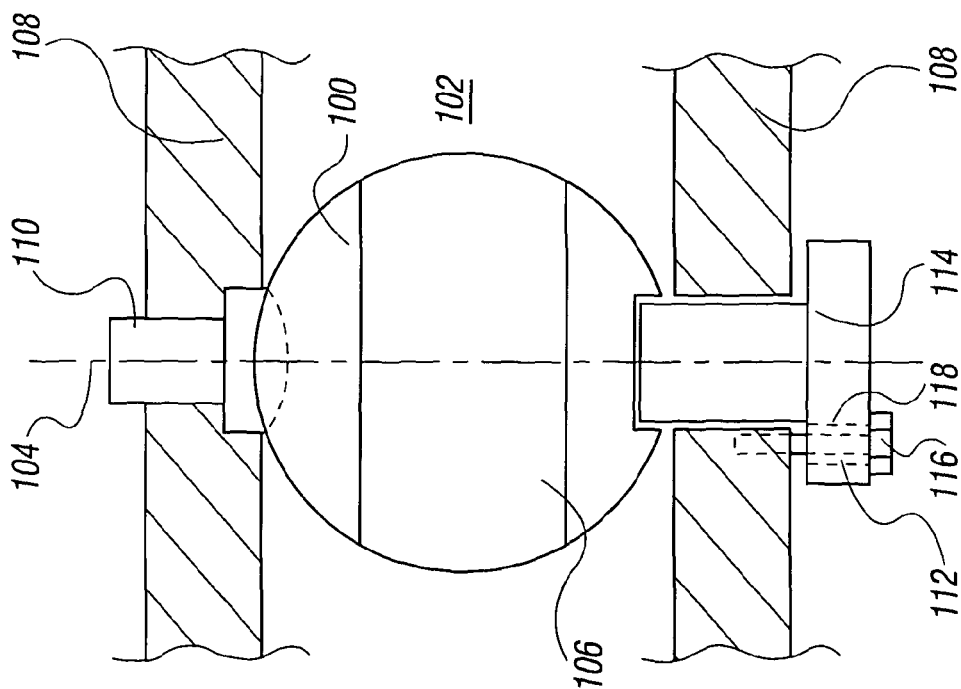

Turning now to FIGS. 3a and b, there is illustrated, in FIG. 3a a conventional ball and trunnion arrangement in a schematic manner. In a conventional arrangement, there is provided a ball 100 located in the valve passageway 102 so as to be rotatable about axis 104 between the valve open position which is shown and the valve closed position in which the channel 106 of the ball is located so as to prevent the fluid flow along passage 102. In this conventional arrangement, the ball is located with respect to the valve body 108 by first and second trunnions, an upper trunnion 110 and a lower trunnion 112. The upper trunnion 110 is typically connected to a handle or other actuation means which allows rotation of the same and hence rotation of the ball between the open and closed positions. The lower trunnion 112 is typically provided with a flange 114 mounted externally of the valve body 108 and the flange 114 receives a plurality of bolts 116, one of which is shown, which passes through an aperture 118 in the flange 114 and into the valve body 108 so as to secure the trunnion in position.

The requirements shown in the conventional design of FIG. 3a for the lower trunnion 112 to be located with the valve body via the external engagement means of the flange and bolts, means that the wall of the valve body 108, and in turn, the outer dimensions of the valve body as a whole, have to be sufficiently large so as to receive and locate the bolts. This therefore means that the overall size of the valve body can be greater than desired.

FIG. 3b illustrates a new embodiment of a trunnion and ball assembly in accordance with the invention. In this case, there is provided ball 100 which again is movable about axis 104 between the respective open and closed positions. The upper trunnion 110 can be provided in a conventional form but the lower trunnion of FIG. 3a is no longer used and instead a cylinder or peg 120 is provided. This peg is received in a locating aperture 122 in the ball 100 and the opposing end of the peg is received in a recess 124 formed in the valve body 108. Thus, the peg 120 is entirely located within the valve body and therefore no engagement flange or bolts are required externally of the valve body. Because the external engagement means are not required, thus the overall dimensions of the valve can be significantly reduced. For example, a reduction of up to 40% in the thickness of the valve body at the location of the peg 120 in comparison to that which would be required if a conventional, externally located trunnion was to be used. Furthermore the use of the internally mounted trunnion avoids problems which can be experienced in the required accuracy of the externally mounted trunnions, especially with relatively large valves. A further and very important advantage which is obtained is that as the trunnion or peg 120 is mounted wholly internally of the valve body no leak path is provided to the external face of the valve assembly. It will be appreciated that with conventional externally mounted trunnions as they pass from the interior of the valve body to the outside this creates a possible leakage path for fluid from the internal passage in the valve which, in turn, means that relatively complex sealing arrangements are required to be provided in the conventional arrangements. This is not required in the current invention.

Although it may not always be required it is envisaged that suitable mechanical location means can be provided as required to allow the trunnion to be located with the ball and/or valve body.

Typically, the retaining peg is introduced into the passage of the valve body once the ball is in position. The peg is then placed into the channel in the ball and then moved downwardly as indicated by arrow 101 to pass into and through the locating aperture 122 and into the recess 124 and it is then held in position such that the valve body can rotate around the peg and about axis 104. A retention means (not shown) may be introduced so as to secure the peg or cylinder to the ball and/or valve body.

Figure 5:
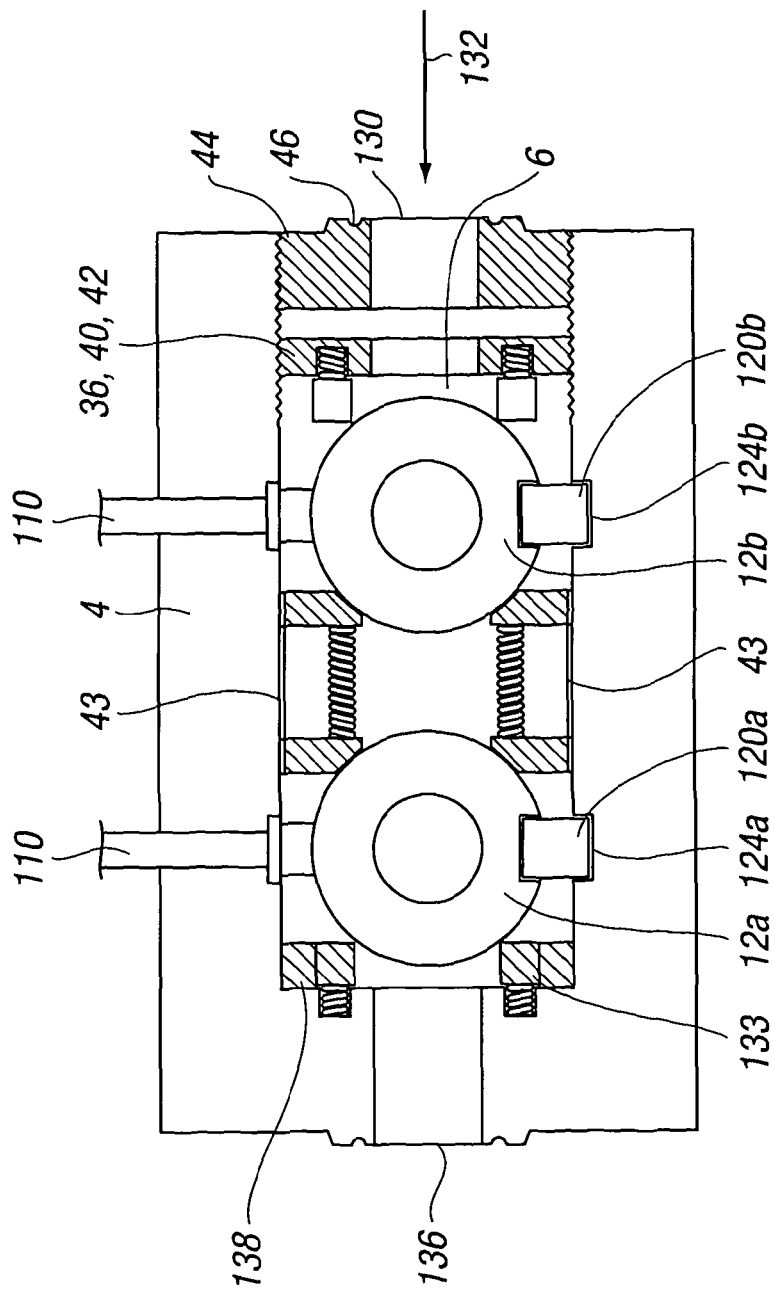
FIG. 5 illustrates a further embodiment of the invention.

Referring now to FIG. 5 there is illustrated a further embodiment of the invention which incorporates the aspects of the invention described herein and the same reference numerals are used herein as appropriate. FIG. 5 also illustrates the manner in which a further aspect of the invention can be achieved, namely the insertion of the components which are to be positioned along the passage 6 from one common end 130 of the valve body 4 in the direction of arrow 132. This is achievable by the use of the aspects of the invention as herein described and importantly allows the valve assembly to be created with the required components in the required location and with a greatly reduced number of leak paths between the passage 6 and the external face of the valve body as the number of interfaces between the passage and the external face of the body is greatly reduced in comparison to conventional valve assemblies in which the components are typically inserted from both ends of the valve body, which therefore doubles the number of leak paths and requires the external mounting of trunnions which again doubles the number of leak paths in comparison to the assembly shown in FIG. 5. This in accordance with the arrangement shown in FIG. 5 the order of insertion of components into position in the valve body through the initially open end 130 of the valve body would be as follows. First insert the sealing ring 133 and any biasing means 134 to the opposing end 136 of the passage and abut the same against locating wall 138 as shown, move the first ball 12a into position as shown, locate the first internally mounted trunnion 120a into position through the channel in the ball and into the recess 124a. Move the sealing assembly 43 of the type shown in FIG. 4a into position to contact with the first ball 12a on one side and, following the insertion of the second ball 12b into position, contact with that ball, move the trunnion 120b into the location recess 124b to locate with the ball 12b and then move the retaining assembly with the first and second annular members and annular housing 36,40,42 and biasing means 38 into position with the annular housing 42 in threaded engagement with the valve body. With these components in position the annular securing member 44 can be engaged with the valve body to retain the other components in position and close the opening 130 and also, as required provided the appropriate external sealing face formation 46 to allow engagement with the pipeline. Thus, the valve components can be inserted from only one end and reduce the number of potential leak paths which, in turn reduces the number of sealing components required to be provided. The trunnions 110 can be introduced and located in a conventional manner.

There is therefore provided an improved version of a valve assembly which ensures the efficient and correct operation of the same whilst ensuring that the same complies with applicable International standards and at the same time provide further advantages over conventional valve assemblies as set out herein. It should be appreciated that while it is preferred that the various aspects described herein be used in combination it is possible and, it is intended to provided protection for, the possible uses of all combinations of the different aspects described hereonin and/or the use of each of the aspects independently of the others to advantageous effect.

The invention claimed is:

1. A valve assembly, said valve assembly including at least one passage along which fluid can be selectively allowed to pass, said assembly including a valve body in which the passage is formed and at least one ball located in the passage so as to be moveable between a first position in which a channel in the ball forms part of the passage and a second position in which the ball prevents fluid passing along the passage and wherein at at least one end of the body and depending inwardly towards one side of the at least one ball there is provided a retention assembly, said assembly comprising a first annular member to contact with the ball, a second annular member receiving and locating at least one biasing means, said first and second annular members located within an annular housing, said annular housing retained within the valve body, and an annular securing member which is engaged with the valve body and which has an outer face which forms or receives an external sealing face for the valve assembly to a pipeline or pipeline flange and wherein the first annular member supports and receives thereon a valve seat.

2. A valve assembly according to claim 1 wherein the annular housing and annular securing member are independently retained with the valve body.

3. A valve assembly according to claim 1 wherein the annular housing is retained in the valve body by the annular securing member.

4. A valve assembly according to claim 1 wherein the external sealing face is adapted so as to allow the external sealing face to be engaged and sealed with a pipeline or a pipeline flange in conjunction with which the valve is to be used.

5. A valve assembly according to claim 1 in which the retention assembly is provided at each end of the valve body.

6. A valve assembly according to claim 1 wherein the valve assembly includes at least first and second balls provided at spaced locations along the fluid passage formed in the valve body and the retention assembly is provided at at least one end of the valve body to contact with a side of one of said first and second balls which lies closest to that end.

7. A valve assembly according to claim 6 wherein the retention assembly is located at the opposing side of the valve assembly to contact with a side of the other of said first and second balls.

8. A valve assembly according to claim 1 wherein when two balls are provided a sealing assembly is provided between balls so as to locate with the respective opposing sides of the balls which face towards each other.

9. A valve assembly according to claim 8 wherein the sealing assembly comprises a first annular seat for contact with a face of a first ball and a second annular seat for contact with a face of a second ball and said first and second seats are provided with at least one biasing means depending between the first and second seats.

10. A valve assembly according to claim 9 wherein a plurality of biasing means are provided spaced apart around a circular path at the periphery of said passage.

11. A valve assembly according to claim 8 wherein the biasing means pass through a channel formed in a portion of the body or another member which depends partially inwardly so as to locate the biasing means with respect to the longitudinal axis of the same.

12. A valve assembly according to claim 1 wherein the first annular member is formed as a valve seat for sealing contact with the ball side.

13. A valve assembly according to claim 1 wherein the biasing means provided in the second annular member are a series of springs provided at spaced locations around a circular path.

14. A valve assembly according to claim 1 wherein a first end of each of the biasing means are located in the second annular member.

15. A valve assembly according to claim 14 wherein said ends are received and located in a part of the second annular member which is received in a recessed portion in the first annular member so as to locate the second annular member therewith.

16. A valve assembly according to claim 14 wherein opposing ends of the biasing means are located with a face of the annular housing.

17. A valve assembly according to claim 1 wherein the biasing means of the first and second annular members are held in compression so as to bias the first annular member towards contact with the at least one ball.

18. A valve assembly according to claim 1 wherein sealing means are provided between the first annular member and the annular housing and the second annular member with the annular housing.

19. A valve assembly according claim 1 wherein biasing means of the first and second annular members are provided to act on the second annular member and are located within, the annular housing such that the biasing means act on the second annular member to move the second annular member towards the first annular member and in turn, to move the first annular member into engagement with the ball.

20. A valve assembly according to claim 1 wherein the at least one ball is mounted on first and second trunnions so as to be rotatable and wherein at least one of said trunnions is mounted and located internally of the valve body.

21. A valve assembly according to claim 1 wherein components which are located within and along the valve body are moved into position from one common end of the valve body and the components are retained in position by the engagement of the annular housing and/or annular securing member in position at or adjacent to the end of the body from which the components are moved into position, once the components are in position.

22. A valve assembly according to claim 21 wherein the components include, in order of insertion into the valve body, a first sealing ring for the valve ball, the valve ball, a trunnion for the valve ball, a sealing assembly for the valve ball and a second valve ball, the second valve ball, a trunnion for the second valve ball, the annular housing with first and second sealing members located therein, and an annular securing member.

23. A valve assembly according to claim 1, wherein a first ball and a second ball are located in the passage, each ball selectively movable between a first position in which a channel in the ball forms part of the passage and a second position in which the ball prevents fluid passing along the passage and wherein a sealing assembly is provided in a space in the valve body between said balls, said sealing assembly including a sealing ring for location with a face of the first ball and a sealing ring for location with a face of the second ball and wherein biasing means are provided for the first and second balls, with a first end of each of the biasing means located to act on the first sealing ring and a second end located to act on the second sealing ring.

24. A valve assembly according to claim 23 wherein the first and second sealing rings are separate components.

25. A valve assembly according to claim 23 wherein at any given time the biasing means bias one of the sealing rings into contact with a respective ball surface.

26. A valve assembly according to claim 23 wherein a plurality of biasing means are provided spaced along a circular path.

27. A valve assembly according to claim 23 wherein the biasing means are located in position by location of ends with the respective sealing rings.

28. A valve assembly according to claim 1 wherein at least a portion of the biasing means intermediate ends of the biasing means are located in a channel.

29. A valve assembly according to claim 28 wherein said channel is formed in a portion of the valve body.

30. A valve assembly according to claim 29 wherein said portion protrudes into the passage of valve body and is located intermediate the first and second sealing rings.

31. A valve assembly according to claim 28 wherein said channel is provided in a member located between first and second sealing rings.

* * * * *